(12) United States Patent
Ko et al.

(10) Patent No.: US 8,488,537 B2
(45) Date of Patent: Jul. 16, 2013

(54) METHOD OF TRANSMITTING CHANNEL INFORMATION IN MULTIPLE ANTENNA SYSTEM

(75) Inventors: Hyun Soo Ko, Anyang-si (KR); Bin Chul Ihm, Anyang-si (KR); Jin Young Chun, Anyang-si (KR); Sung Ho Park, Anyang-si (KR); Wook Bong Lee, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 319 days.

(21) Appl. No.: 12/673,484

(22) PCT Filed: Aug. 14, 2008

(86) PCT No.: PCT/KR2008/004732
§ 371 (c)(1),
(2), (4) Date: Feb. 12, 2010

(87) PCT Pub. No.: WO2009/022868
PCT Pub. Date: Feb. 19, 2009

(65) Prior Publication Data
US 2011/0249629 A1    Oct. 13, 2011

Related U.S. Application Data

(60) Provisional application No. 60/955,650, filed on Aug. 14, 2007.

(30) Foreign Application Priority Data

Dec. 26, 2007    (KR) .................. 10-2007-0137470

(51) Int. Cl.
*H04B 7/005*    (2006.01)
*H04B 7/212*    (2006.01)
*H04W 4/00*    (2009.01)

(52) U.S. Cl.
USPC ........... 370/329; 370/278; 370/322; 370/328; 370/334; 370/341

(58) Field of Classification Search
None
See application file for complete search history.

(56) References Cited

U.S. PATENT DOCUMENTS

| | | | |
|---|---|---|---|
| 2002/0154612 A1* | 10/2002 | Massie et al. | 370/329 |
| 2004/0009767 A1 | 1/2004 | Lee et al. | |
| 2004/0116139 A1* | 6/2004 | Yi et al. | 455/503 |
| 2005/0201296 A1 | 9/2005 | Vannithamby et al. | |
| 2008/0187030 A1* | 8/2008 | Khan | 375/219 |

FOREIGN PATENT DOCUMENTS
WO    WO 2007/052941    5/2007

* cited by examiner

*Primary Examiner* — Faruk Hamza
*Assistant Examiner* — Diane Lo
(74) *Attorney, Agent, or Firm* — McKenna Long & Aldridge LLP (57) ABSTRACT

A method of transmitting channel information in a multiple antenna system includes receiving the channel information comprising rank information, and transmitting a confirm message through a downlink control channel as a confirmation for the channel information, wherein the confirm message comprises overriding rank information which overrides the received rank information in an open loop scheme and also comprises information indicating whether the received channel information is used without alteration in a closed loop scheme. A rank indicator (RI) and a precoding matrix indicator (PMI) can be carried on a dedicated control channel (DCCH) and be specified through a physical downlink control channel (PDCCH).

6 Claims, 12 Drawing Sheets

METHOD OF TRANSMITTING CHANNEL INFORMATION IN MULTIPLE ANTENNA SYSTEM

This application is a National Stage Entry of International Application No. PCT/KR2008/004732, filed on Aug. 14, 2008, and claims priority to Korean Patent Application No. 10-2007-0137470, filed Dec. 26, 2007; and U.S. Provisional Application No. 60/955,650, filed Aug. 14, 2007, each of which is hereby incorporated by reference in its entirety as if fully set forth herein.

TECHNICAL FIELD

The present invention relates to wireless communications, and more particularly, to a method for transmitting channel information in a multiple antenna system.

BACKGROUND ART

Wireless communication systems are widely used to provide various types of communications. For example, voice and/or data are provided by the wireless communication systems. A conventional wireless communication system provides multiple users with one or more shared resources. For example, the wireless communication system can use various multiple access schemes such as code division multiple access (CDMA), time division multiple access (TDMA), and frequency division multiple access (FDMA).

An orthogonal frequency division multiplexing (OFDM) scheme uses a plurality of orthogonal subcarriers. Further, the OFDM scheme uses an orthogonality between inverse fast Fourier transform (IFFT) and fast Fourier transform (FFT). A transmitter transmits data by performing IFFT. A receiver restores original data by performing FFT on a received signal. The transmitter uses IFFT to combine the plurality of subcarriers, and the receiver uses FFT to split the plurality of subcarriers. According to the OFDM scheme, complexity of the receiver can be reduced in a frequency selective fading environment of a broadband channel, and spectral efficiency can be improved through selective scheduling in a frequency domain by utilizing channel characteristics which are different from one subcarrier to another. An orthogonal frequency division multiple access (OFDMA) scheme is an OFDM-based multiple access scheme. According to the OFDMA scheme, a radio resource can be more efficiently used by assigning different subcarriers to multiple users.

Recently, to maximize performance and communication capability of the wireless communication system, attention is paid to a multiple input multiple output (MIMO) system. Being evolved from the conventional technique in which a single transmit (Tx) antenna and a single receive (Rx) antenna are used, a MIMO technique uses multiple Tx antennas and multiple Rx antennas in order to improve efficiency of data transmission and reception. The MIMO system is also referred to as a multiple antenna system. In the MIMO technique, instead of receiving one whole message through a single antenna path, data segments are received through a plurality of antennas and are then assembled into one piece of data. As a result, a data transfer rate can be improved in a specific range, or a system range can increase with respect to a specific data transfer rate.

Hereinafter, downlink is defined as a communication link from a base station (BS) to a user equipment (UE), and uplink is defined as a communication link from the UE to the BS.

In general, the BS schedules uplink and downlink radio resources in the wireless communication system. User data or control signals are carried using the uplink and downlink radio resources. A channel for carrying user data is referred to as a data channel. A channel for carrying control information is referred to as a control channel. A physical layer channel for transmitting the control information from the BS to the UE is referred to as a physical downlink control channel (PDCCH) or downlink layer 1/layer 2 (DL L1/L2) control channel. A physical layer channel for transmitting the control information from the UE to the BS is referred to as a physical uplink control channel (PUCCH) or an uplink layer 1/layer 2 (UL L1/L2) control channel. The control information transmitted through the PUCCH may be various, e.g., a scheduling request signal for requesting radio resource allocation, an acknowledgement (ACK)/negative-acknowledgement (NACK) signal that is a response for transmission of downlink data, a channel quality indicator (CQI) indicating downlink channel quality, a rank indicator (RI) that is MIMO-related control information, a precoding matrix indicator (PMI), etc.

The BS schedules the uplink and downlink radio resources according to the control information received from the UE, and reports scheduling information to the UE through the PDCCH. The BS may use the RI and the PMI transmitted by the UE without alteration. The RI and the PMI may be determined and used by the BS. The BS has to report the RI and the PMI used in radio resource scheduling to the UE through the PDCCH. However, the PDCCH is limited in size, and there is also a limit when a system using 4 Tx antennas transmits the RI and PMI with a size of 6 bits through the limited PDCCH. That is, since the RI and PMI, which can be transmitted for multiples users through the PDCCH during one transmission time interval (TTI), are limited, a multi-user scheduling gain cannot be obtained.

Accordingly, there is a need for a method for effectively transmitting MIMO-related information to a UE in a multiple antenna system.

DISCLOSURE OF INVENTION

Technical Problem

The present invention provides a method for effectively transmitting multiple input multiple output (MIMO)-related information to a user equipment in a multiple antenna system.

Technical Solution

In an aspect, a method of transmitting channel information in a multiple antenna system includes receiving the channel information comprising rank information, and transmitting a confirm message through a downlink control channel as a confirmation for the channel information, wherein the confirm message comprises overriding rank information which overrides the received rank information in an open loop scheme and also comprises information indicating whether the received channel information is used without alteration in a closed loop scheme.

In another aspect, a method of transmitting channel information in a multiple antenna system is provided. The method includes: receiving feedback data through an uplink control channel; transmitting a confirm message through a downlink control channel for periodically transmitting control information in response to the feedback data; and transmitting a precoding matrix indicator (PMI) through a dedicated control channel indicated by the confirm message, wherein the dedicated control channel transmits the control information non-periodically.

Advantageous Effects

A rank indicator (RI) and a precoding matrix indicator (PMI) are carried on a dedicated control channel (DCCH) and are specified through a physical downlink control channel (PDCCH). Therefore, a limited PDCCH can be effectively used. In addition, the RI and the PMI can be reported to a user equipment by assigning the DCCH when necessary (or non-periodically). As a result, an unnecessary overhead can be removed.

MODE FOR THE INVENTION

Figure 1:
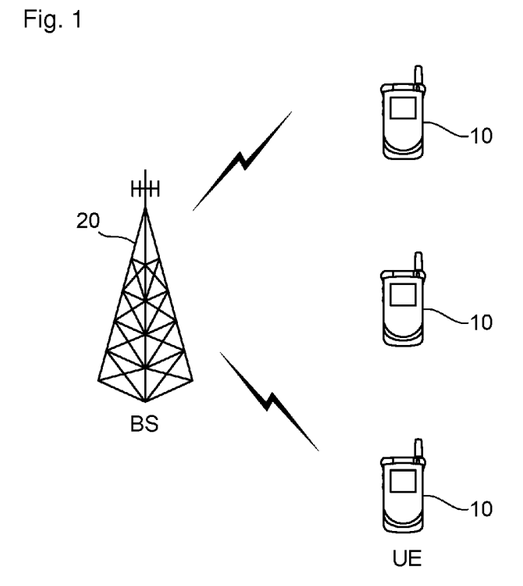
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

There is no restriction on a multiple access scheme used in the wireless communication system. The multiple access scheme may be based on code division multiple access (CDMA), time division multiple access (TDMA), frequency division multiple access (FDMA), single-carrier FDMA (SC-FDMA), orthogonal frequency division multiple access (OFDMA), or other well-known modulation schemes. For clarity, an OFDMA-based wireless communication system will be described hereinafter.

The wireless communication system may be a multiple antenna system. The multiple antenna system may be a multiple input multiple output (MIMO) system. Alternatively, the multiple antenna system may be a multiple-input single-output (MISO) system or a single-input multiple-output (SIMO) system. The MIMO system uses a plurality of transmit (Tx) antennas and a plurality of receive (Rx) antennas. The MISO system uses a plurality of Tx antennas and one Rx antenna. The SIMO system uses one Tx antenna and a plurality of Rx antennas.

In the MIMO scheme, a transmitter uses two or more antennas to transmit data through multiple paths, and a receiver detects signals received through the respective paths. The MIMO scheme has characteristics of spatial diversity, beamforming, spatial multiplexing, etc.

The spatial diversity provides stable operations when a channel quality indicator (CQI) is fed back with a low reliability from a UE due to a fading effect. Further, when a service to be provided has a delay-sensitive type of traffic, the spatial diversity can be used in replacement of a technique for dealing with fading without having to wait until a channel condition is improved. A transmit diversity is a representative spatial diversity technique and may be used when a channel condition cannot be known to a transmitter having multiple Tx antennas.

The beamforming is used to increase a signal to interference plus noise ratio (SINR) of a signal by adding a weight factor to multiple antennas according to the channel condition. The weight factor can be represented with a weight matrix. The weight matrix is referred to as a precoding matrix. The precoding matrix may be directly transmitted between a BS and a user. Alternatively, a precoding matrix indicator (PMI) may be transmitted instead of directly transmitting the precoding matrix.

The spatial multiplexing is classified into single-user spatial multiplexing and multi-user spatial multiplexing. The single-user spatial multiplexing is also referred to as a single user MIMO (SU-MIMO). The multi-user spatial multiplexing is also referred to as a spatial division multiple access (SDMA) or a multi user MIMO (MU-MIMO). A capacity of a MIMO channel increases in proportion to the number of antennas. The MIMO channel can be decomposed into independent channels. If the number of Tx antennas is Nt, and the number of Rx antennas is Nr, then the number of independent channels is Ni where $Ni \leq \min\{Nt, Nr\}$. Each independent channel can be referred to as a spatial layer. A rank represents the number of non-zero eigen-values of the MIMO channel and can be defined as the number of spatial streams that can be multiplexed.

The characteristics of the MIMO scheme may be combined for use. Examples of a MIMO scheme in which the spatial diversity and the spatial multiplexing are combined include a space-frequency block code (SFBC), a space-time block code (STBC), a cyclic delay diversity (CDD), and a SFBC/CDD combined scheme. The SFBC is a scheme in which selectivity in a space domain and a frequency domain is effectively used to ensure a diversity gain of a corresponding dimension as well as a multiple user scheduling gain. The CDD is a scheme in which selectivity in a time domain and a frequency domain is effectively used to ensure a diversity gain of a corresponding dimension as well as a multiple user scheduling gain. The SFBD, the CDD and SFBC/CDD combined scheme can be used in an open-loop transmit diversity scheme.

Figure 2:
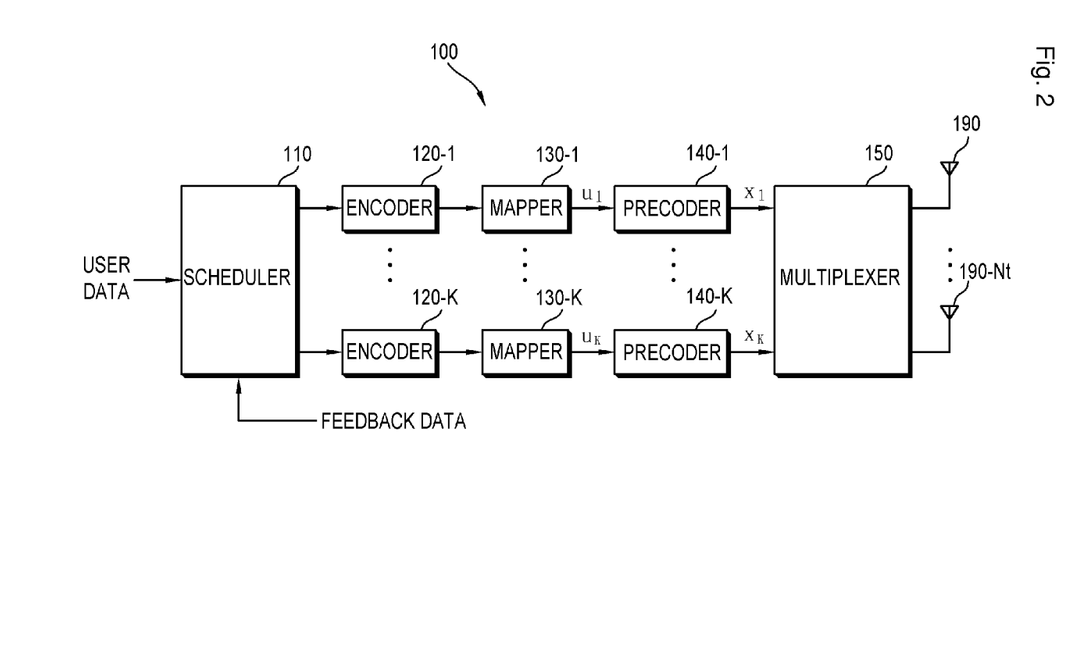
FIG. 2 is a block diagram showing a transmitter having multiple antennas.

FIG. 2 is a block diagram showing a transmitter having multiple antennas.

Referring to FIG. 2, a transmitter 100 includes a scheduler 110, channel encoders 120-1 to 120-K, mappers 130-1 to 130-K, precoders 140-1 to 140-K, and a multiplexer 150. The transmitter 100 includes Nt (Nt>1) Tx antennas 190-1 to 190-Nt. The transmitter 100 may be a part of a BS in downlink. The transmitter 100 may be a part of a UE in uplink.

The scheduler 110 receives data from N users and outputs K streams to be concurrently transmitted. By using channel information of each user, the scheduler 110 determines a user and a data transfer rate for transmitting data through available radio resources. The scheduler 110 extracts a CQI from feedback data, and selects a modulation and coding scheme (MCS) or the like. The CQI includes a signal to noise ratio (SNR), a signal to interference and noise ratio (SINR), etc., determined between the transmitter and a receiver.

The available radio resources allocated by the scheduler 110 denote radio resources used for data transmission in the wireless communication system. For example, all time slots are resources in a TDMA system, all codes and time slots are resources in a CDMA system, and all subcarrier and time slots are resources in an OFDMA system. The respective resources may be orthogonal to each other by definition in a time, code, or frequency domain so that interference to another user does not occur in the same cell or sector.

The channel encoders 120-1 to 120-K encode input streams according to a predetermined coding scheme, and thus generate coded data. The mappers 130-1 to 130-K map the coded data onto symbols representing locations on a signal constellation. These symbols are called data symbols. There is no restriction on a modulation scheme. The modulation scheme may be m-phase shift keying (m-PSK) or m-quadrature amplitude modulation (m-QAM). For example, the m-PSK may be binary PSK (BPSK), quadrature PSK (QPSK), or 8-PSK. The m-QAM may be 16-QAM, 64-QAM, or 256-QAM.

The precoders 140-1 to 140-K perform precoding on received data symbols $u_1, \ldots, u_K$ and thus generate input symbols $x_1, \ldots, x_K$. The precoding is a scheme for pre-processing data symbols to be transmitted. Examples of the precoding scheme include random beamforming (RBF), zero forcing beamforming (ZFBF), etc., in which input symbols are generated by applying a weighting vector or a precoding matrix to the data symbols.

The multiplexer 150 assigns the input symbols $x_1, \ldots, x_K$ to suitable subcarriers, and multiplexes the symbols according to a user. The multiplexed symbols are modulated and then transmitted through the Tx antennas 190-1 to 190-Nt.

Figure 3:
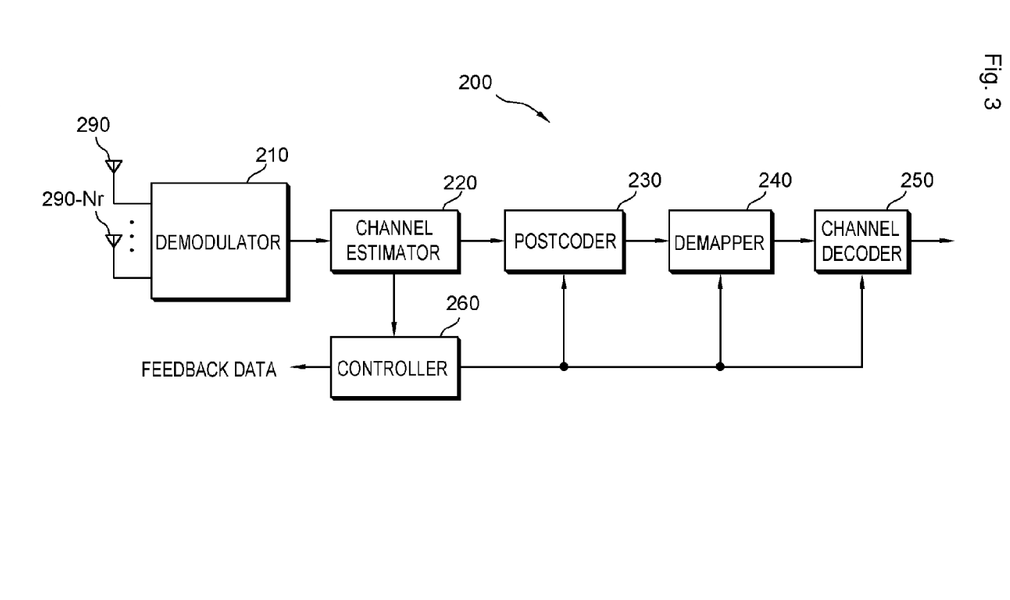
FIG. 3 is a block diagram showing a receiver having multiple antennas.

FIG. 3 is a block diagram showing a receiver having multiple antennas.

Referring to FIG. 3, a receiver 200 includes a demodulator 210, a channel estimator 220, a post-coder 230, a demapper 240, a channel decoder 250, and a controller 260. Further, the receiver 200 includes Nr (Nr>1) Rx antennas 290-1 to 290-Nr. The receiver 200 may be a part of a UE in downlink. The receiver 200 may be a part of a BS in uplink.

Signals received from the Rx antennas 290-1 to 290-Nr are demodulated by the demodulator 210. The channel estimator 220 estimates a channel. The post-coder 230 performs post-coding corresponding to the pre-coding of the precoders 140-1 to 140-K. The demapper 240 de-maps input symbols into coded data. The channel decoder 250 decodes the coded data to restore original data. The controller 260 feeds back feedback data to a transmitter. The feedback data includes channel state information (CSI), channel quality information (CQI), user priority information, etc.

Figure 4:
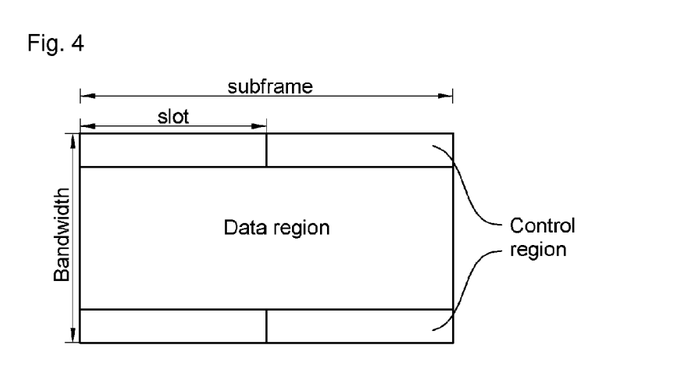
FIG. 4 shows an example of a subframe.

FIG. 4 shows an example of a subframe.

Referring to FIG. 4, the subframe can be divided into a control region and a data region. The control region is for carrying control information. The data region is for carrying user data. The control region and the data region can construct one subframe. Examples of the control information include an ACK/NACK signal, a CQI, an RI, a PMI, etc. The control region is used to carry the control information alone. The data region is used to carry the user data alone or to carry both the user data and the control information. The control information of the control region can be transmitted in downlink through a physical downlink control channel (PDCCH) and can be transmitted in uplink through a physical uplink control channel (PUCCH). The user data can be transmitted in downlink through a physical downlink shared channel (PDSCH) and can be transmitted in uplink through a physical uplink shared channel (PUSCH). The control information of the data region can be transmitted through a dedicated control channel (DCCH). The DCCH is a channel for transmitting the control information by using a specific region included in the data region.

A subframe can include 2 slots. The slot is a unit of radio resource allocation in a time domain and a frequency domain. One slot can include a plurality of OFDM symbols in the time domain and at least one subcarrier in the frequency domain. For example, one slot can include 7 or 6 OFDM symbols. The subframe can include a plurality of resource blocks (RBs). The RB is a basic unit of radio resources allocated to the UE. The RB can include a plurality of subcarriers. For example, the RB may be a region consisting of 12 contiguous subcarriers in the frequency domain and 2 slots in the time domain. One radio frame can include 10 subframes. A time for transmitting one subframe is defined as a transmission time interval (TTI). For example, when the TTI is 1 ms, a time for transmitting one radio frame is 10 ms.

The subframe divides a frequency band into 3 parts. Two parts at both ends of the frequency band are used as the control region, and a middle part of the frequency band is used as the data region. Since the control region and the data region use different frequency bands, frequency division multiplexing (FDM) have been achieved. This is for exemplary purposes only, and thus the arrangement of the control region and the data region in the subframe is not limited thereto. In addition, the number of subframes included in the radio frame, the number of slots included in the subframe, and the number of OFDM symbols included in the slot can vary in various ways.

The slot assigned to each UE can be frequency-hopped in the subframe. That is, one of two slots assigned to one UE can be assigned to one side of the frequency band, and the other slot can be assigned to the other side of the frequency band. A frequency diversity gain can be obtained by transmitting the control channel for one UE through the slots assigned to the different frequency bands. In addition, a plurality of users may be multiplexed by code division multiplexing (CDM).

Figure 5:
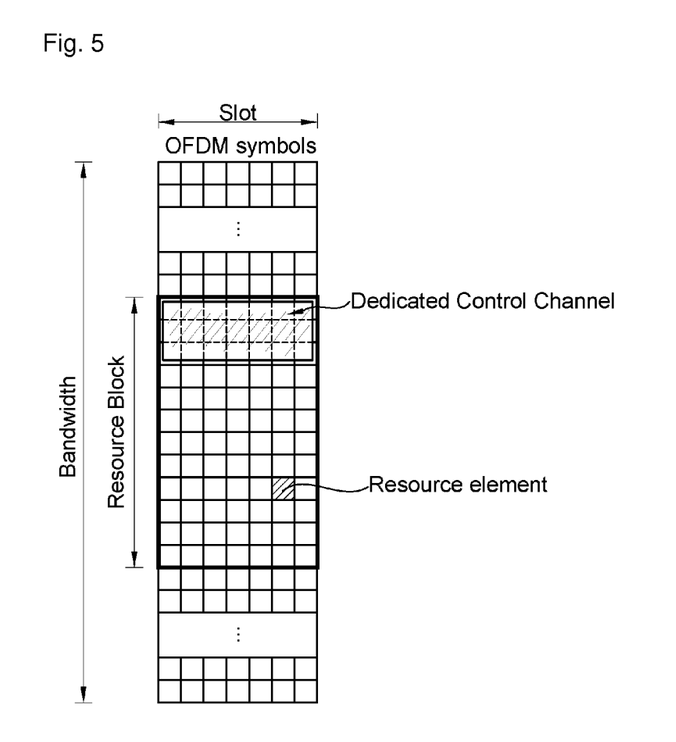
FIG. 5 shows an example of a resource grid.

FIG. 5 shows an example of a resource grid. It is assumed herein that downlink resources are used. However, the same can also apply to uplink resources.

Referring to FIG. 5, a downlink radio resource includes a plurality of resource elements. The resource element is defined with a subcarrier and an OFDM symbol. A bandwidth includes at least one resource block (RB). The RB may include a plurality of subcarriers. It is assumed herein that the RB is a region consisting of 12 contiguous subcarriers in a frequency domain and one slot in a time domain. The number of resource elements included in the RB is defined as the number of subcarriers in the frequency domain the number of OFDM symbols in the time domain.

The RB is a basic unit of radio resources allocated to one user. One or more radio resources can be allocated to one user. In a data region, an RB assigned to a user may include a DCCH. The DCCH is assigned when necessary, and transmits control information that cannot be transmitted through a PDCCH or a PUCCH. Control information transmitted through the PDCCH or the PUCCH is periodically transmitted, whereas control information transmitted through the DCCH is non-periodically transmitted.

If it is assumed that a plurality of RBs are assigned to the user in the data region, the DCCH can occupy a region assigned to the user as follows.

1. The DCCH can occupy a portion of a first RB or a specific RB of a predetermined sequence among the plurality of RBs assigned to the user. As illustrated, a predetermined number of contiguous resource elements included in the RB can be used as the DCCH. There is no restriction on the range and the number of RBs used as the DCCH.

2. The DCCH can occupy a first RB or one (or two) or more RBs of a predetermined sequence among the plurality of RBs assigned to the user. At least one RB can be used as the DCCH.

3. The DCCH can occupy resource elements spread over one RB predetermined among the plurality of RBs assigned to the user. A predetermined number of spread resource elements included in the RB can be used as the DCCH. The resource elements used as the DCCH can be spread over the frequency domain and/or the time domain. There is no restriction on the number of resource elements.

4. The DCCH can occupy resource elements spread over the plurality of RBs assigned to the user. A predetermined number of resource elements spread over the plurality of RBs can be used as the DCCH. The resource elements used as the DCCH can be spread over the frequency domain and/or the time domain. There is no restriction on the number of resource elements.

5. The DCCH can occupy a portion of the data region irrespective of the RBs assigned to the user. The portion of the data region can be used as a region for the DCCH.

Now, a method for transmitting control information by a BS through a PDCCH and a DCCH will be described.

Figure 6:
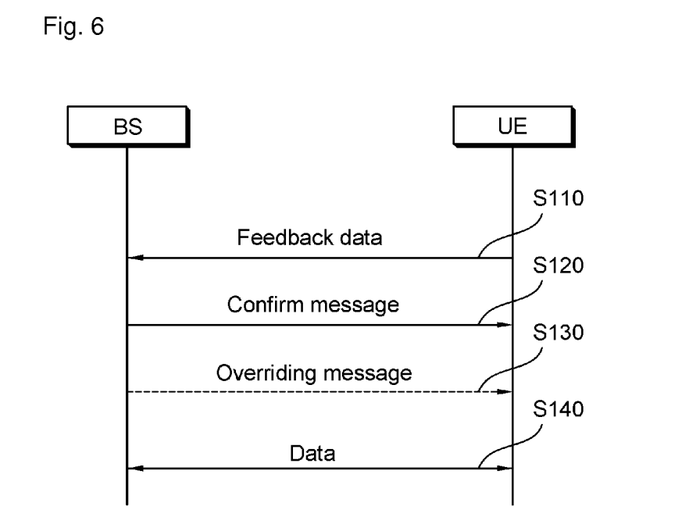
FIG. 6 is a flow diagram showing a method for transmitting control information according to an embodiment of the present invention.
Figure 7:
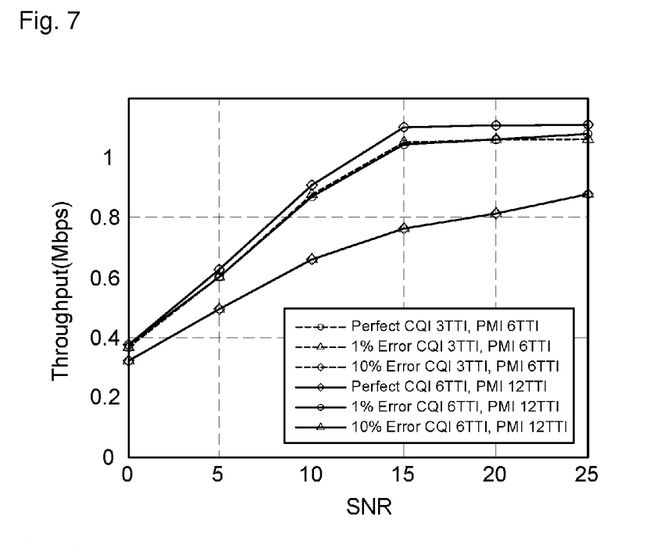
FIGS. 7 to 14 are graphs showing system throughput in a case where a confirm message is not transmitted in response to feedback data received from a user equipment.
Figure 8:
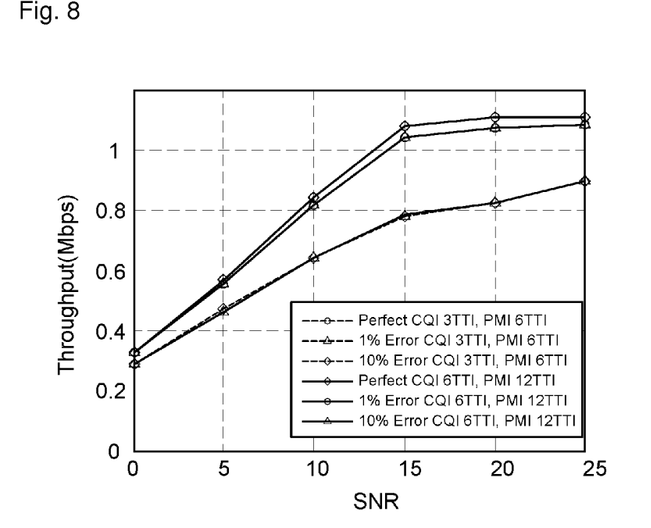
Figure 9:
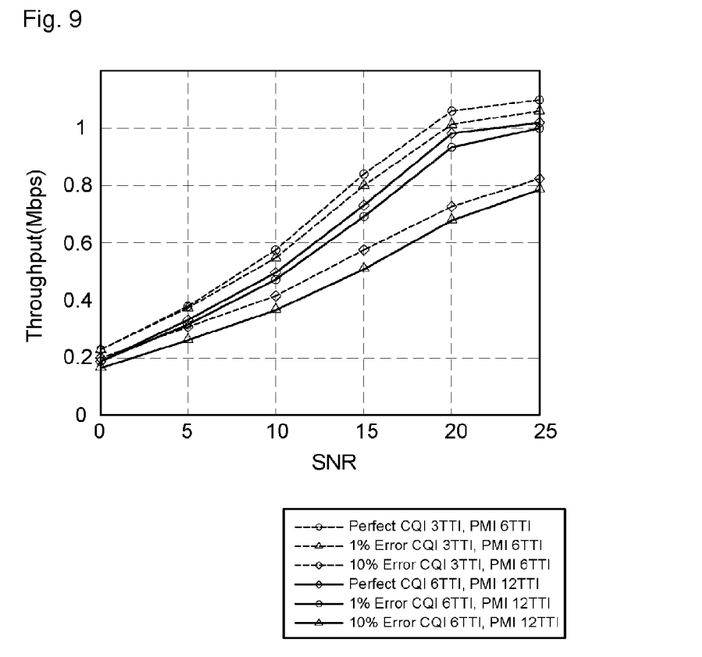
Figure 10:
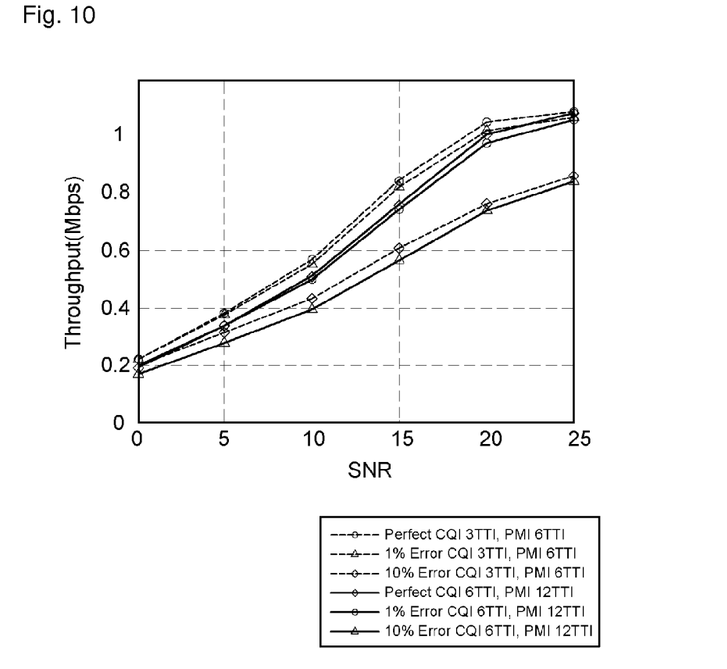
Figure 11:
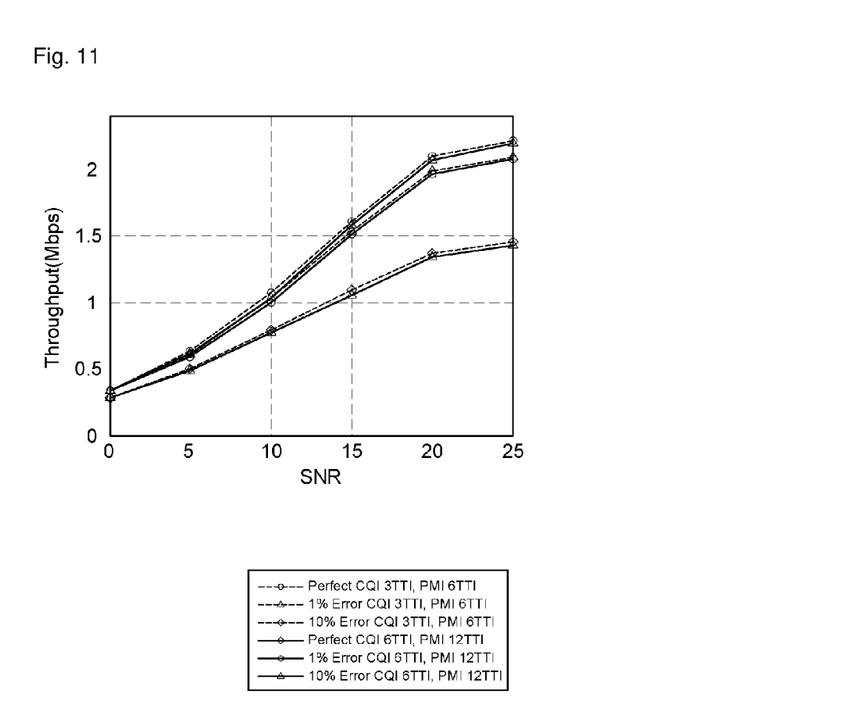
Figure 12:
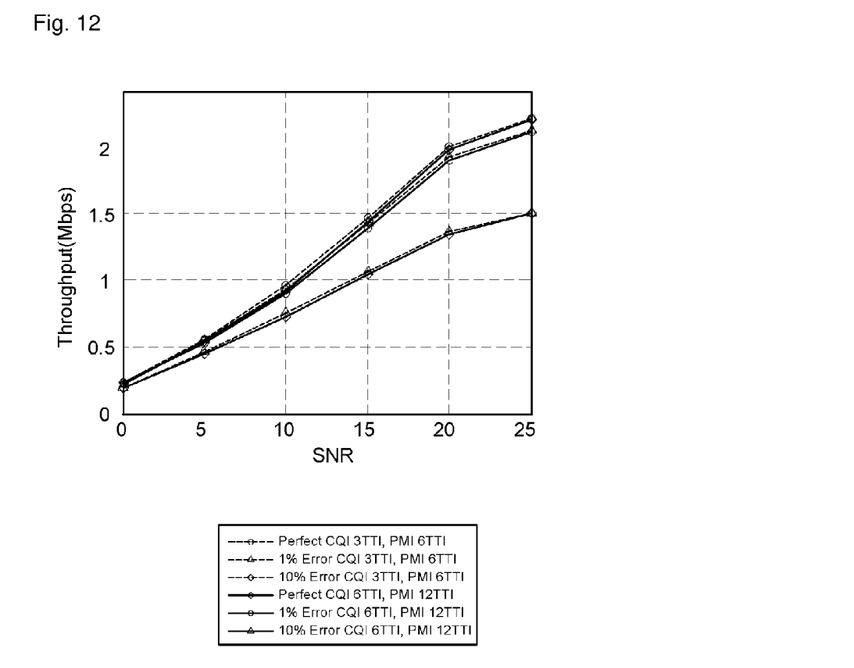
Figure 13:
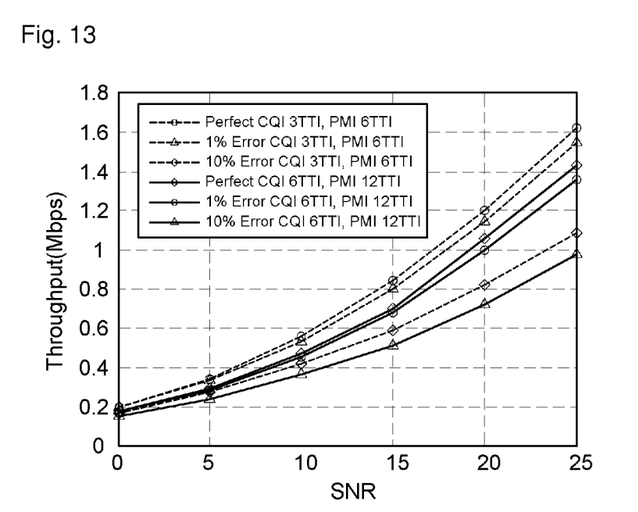
Figure 14:
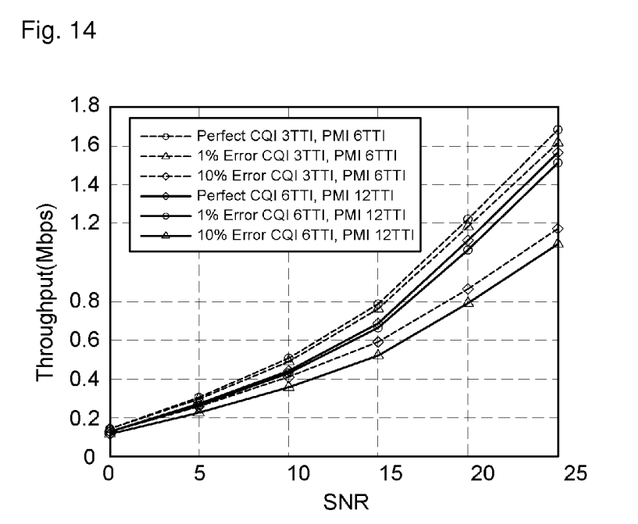
Figure 15:
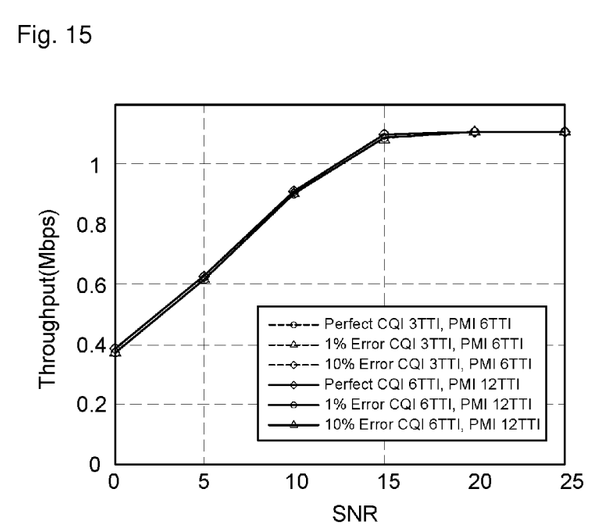
FIGS. 15 to 22 are graphs showing system throughput in a case where a precoding matrix indicator (PMI) transmitted one period earlier by a user equipment is used when an error occurs in feedback data received from the user equipment.
Figure 16:
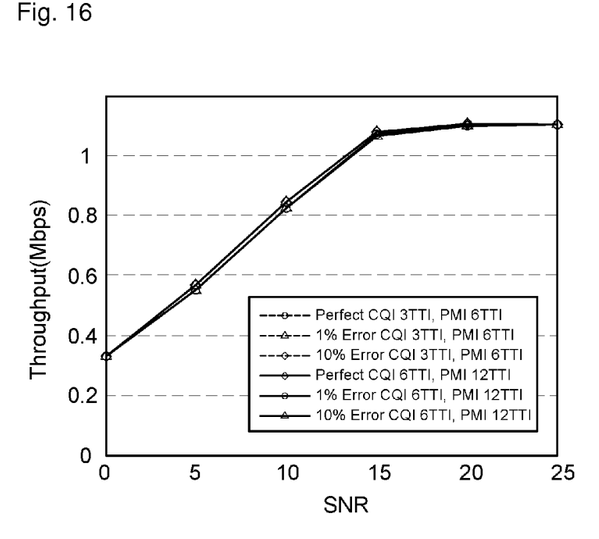
Figure 17:
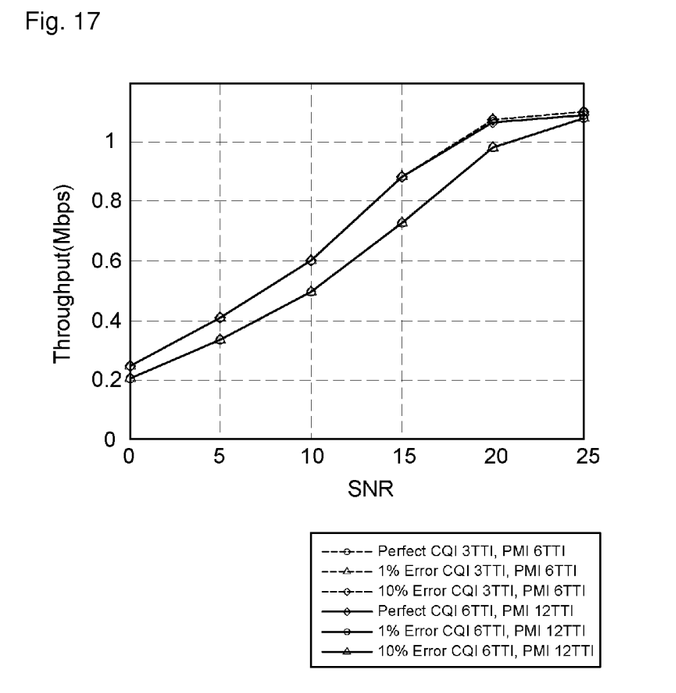
Figure 18:
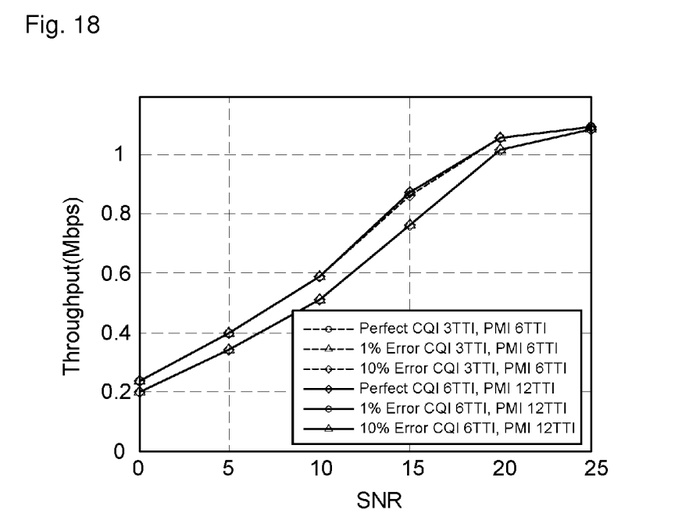
Figure 19:
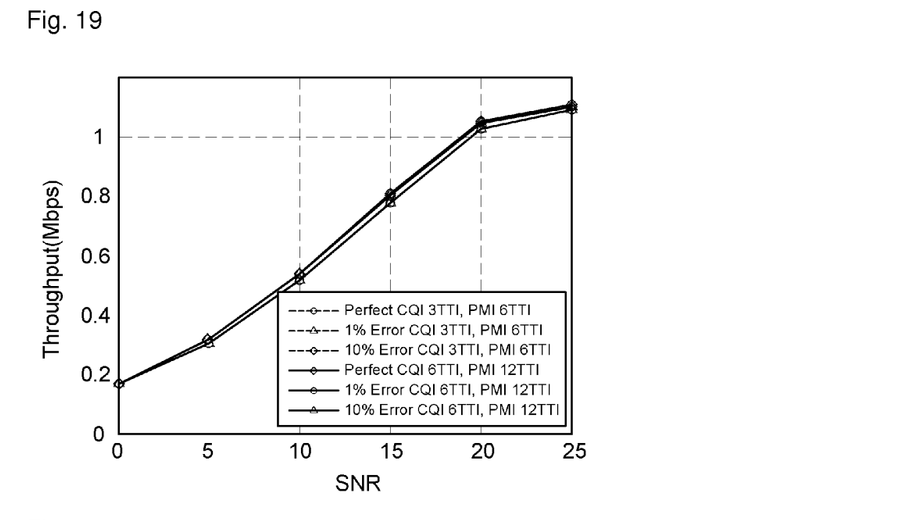
Figure 20:
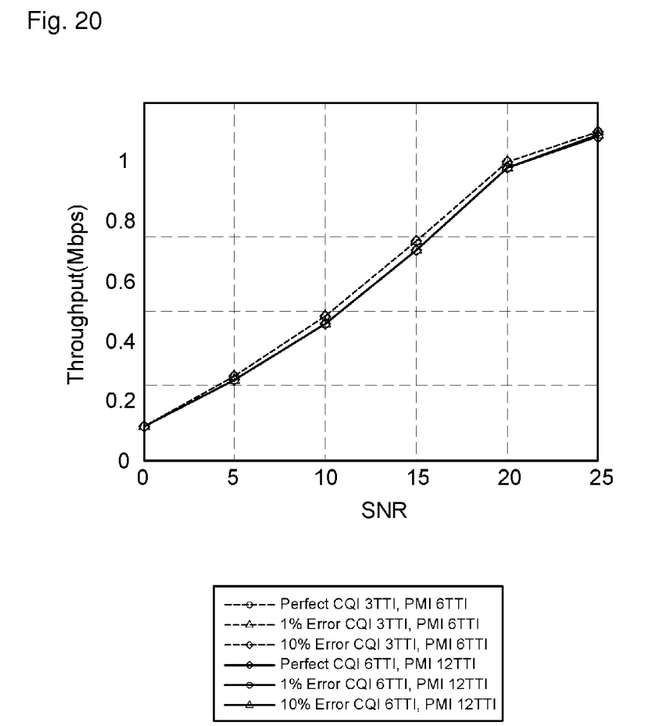
Figure 21:
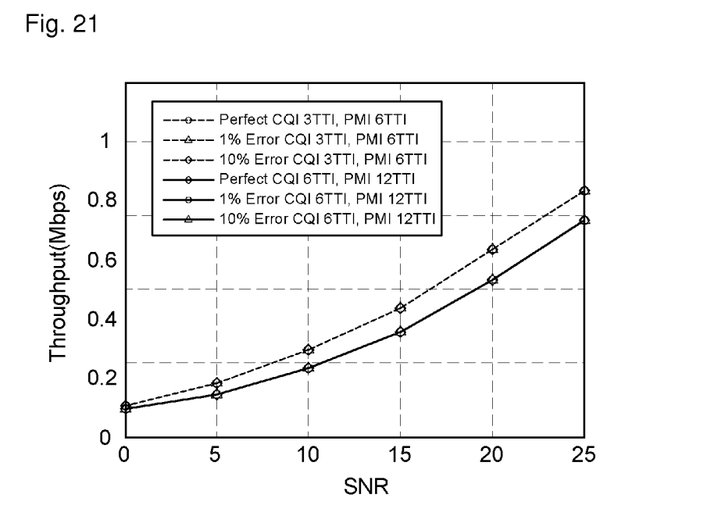
Figure 22:
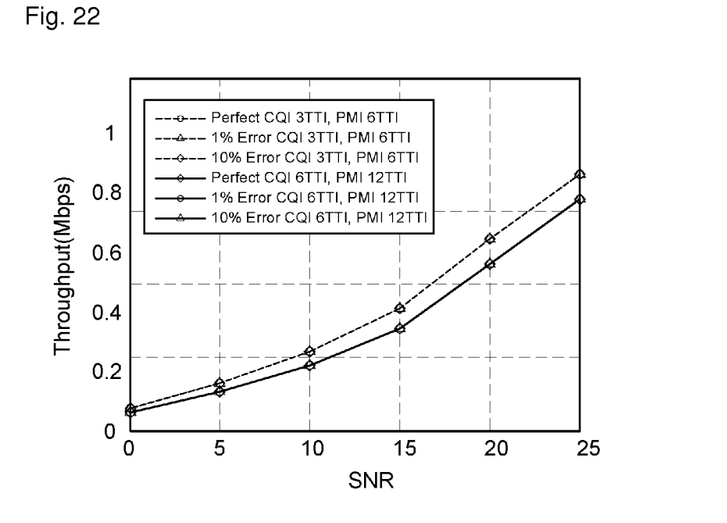

FIG. 6 is a flow diagram showing a method for transmitting control information according to an embodiment of the present invention. In this method, MIMO-related information is transmitted using SU-MIMO.

Referring to FIG. 6, a UE transmits feedback data to a BS (step S110). The feedback data may be transmitted in response to a downlink control signal of the BS or may be periodically transmitted according to a predetermined transmission period. The feedback data may be transmitted through a PUCCH by including a variety of control information (e.g., a CQI, an RI, a PMI, etc). The control information included in the feedback data indicates channel information required for data transmission. For frequency selective precoding, PMIs for respective subbands can be transmitted. The subband includes at least one resource block. System throughput increases when all PMIs are transmitted for the respective subbands. However, an overhead caused by feedback data also increases along with the increase of throughput. M subbands having good channel conditions can be selected among a plurality of subbands included in the entire bandwidth so that the PMIs for the selected subbands are transmitted, which is referred to as a best-M scheme.

The feedback data may not be transmitted in an open loop scheme, and even if it is transmitted, control information included in the feedback data may not be used. In the open loop scheme, data is transmitted without compensating for the channel information included in the feedback data received from the UE. In a closed loop scheme, data is transmitted by compensating for the channel information included in the feedback data received from the UE. Generally, in the communication system, the open loop scheme can be used in a channel environment where the UE moves with a high speed, and the closed loop scheme can be used in a channel environment where the UE moves with a slow speed. More specifically, the open loop scheme is used when the UE moves with a high speed since a channel variation is significant and thus channel information included in feedback data is unreliable. In addition, the closed loop scheme is used when the UE moves with a slow speed since a channel variation is relatively less significant and thus channel information included in feedback data is reliable and is less sensitive to delay.

The BS transmits a confirm message to the UE (step S120). The confirm message is transmitted through the PDCCH. The confirm message may include different control information according to the open/closed loop scheme. The confirm message can indicate rank information used in the open loop scheme. The confirm message can indicate a response for feedback data in the closed loop scheme. Whether a scheme currently in use is the open loop scheme or the closed loop scheme can be mutually known to the BS and the UE through signaling of an upper layer. Alternatively, the BS may determine the open/closed loop scheme and reports the determined scheme to the UE. The confirm message can have a specific size irrespective of which scheme is used between the open/closed loop scheme. When the confirm message has a specific size, the system can be simplified by reducing the number of times of performing blind detection.

Table 1 shows an example of the confirm message.

TABLE 1

| Bits | Open loop | Closed loop |
| --- | --- | --- |
| 00 | Rank 1 | Confirm the most recently reported information |
| 01 | Rank 2 | Reuse earlier reported information |
| 10 | Rank 3 | Switch to default MIMO mode |
| 11 | Rank 4 | Assign dedicated control channel |

In the open loop scheme, the confirm message has a size of 2 bits and indicates ranks 1 to 4. The faster the UE moves, the more frequent the rank changes. Therefore, when using the open loop scheme, the BS needs to report the rank information to the UE. The BS can report information of the ranks 1 to 4 to the UE by using the 2-bit confirm message. If the rank information transmitted from the UE has an error, the BS may inform the UE to use another rank. The UE transmits/receives data by using the rank reported by the BS.

In the closed loop scheme, the confirm message has a size of 2 bits and indicates a response for the feedback data. A bit value '00' indicates that the UE confirms and uses the most recently reported information. That is, by using the confirm message, the BS informs the UE that a PMI reported by the UE is used without alteration. A bit value '01' indicates that the UE uses control information previously transmitted. That is, by using the confirm message, the BS informs the UE that the UE uses a PMI of previously transmitted control information (i.e., $(n-k)^{th}$ control information) reported prior to $n^{th}$ control information which is the most recently reported by the UE. The value k may be experimentally set to 1, and even in this case, system throughput can be improved. A bit value '10' indicates that the UE uses a default MIMO mode. In the default MIMO mode, the BS and the UE use a predetermined PMI. If the UE uses previously reported control information, the default MIMO mode can be selected when errors are continuously detected from feedback data transmitted from the UE. A bit value '11' indicates that a DCCH is assigned.

If the confirm message has a bit value of '11', the BS transmits a overriding message through the DCCH to specify an RI and a PMI (step S130). The RI and the PMI specified by the BS are carried on the DCCH. That is, the BS may indicate assignment of the DCCH by using the confirm message transmitted through the PDCCH, and may specify and report the RI and the PMI to the UE through the DCCH. The transmission of the RI and the PMI specified by the BS through the PDCCH results in increase of an overhead of the limited PDCCH, thereby deteriorating efficiency of the PDCCH. In addition, when the RI and the PMI are transmitted using a dedicated pilot at a fixed location of the data region, the unnecessary overhead increases in the data region. The limited PDCCH can be effectively used when the RI and the PMI are carried on the DCCH and are specified through the PDCCH. In addition, the unnecessary overhead can be removed since the RI and the PMI can be reported to the UE by assigning the DCCH when necessary (or non-periodically).

The BS and the UE transmit/receive data according to the rank information indicated by the conform message of the control information included in the response for the feedback data (step S140).

The number of bits of the confirm message transmitted through the PDCCH is not limited, and the confirm message can be represented in various bits. Although it has been described above that the RI and/or the PMI are transmitted through the DCCH, the present invention is not limited thereto. Thus, not only the MIMO-related information but also a variety of control information can be carried on the DCCH. Examples of the variety of control information carried on the DCCH include resource allocation information, a modulation scheme, hybrid automatic repeat request (HARQ) information, etc.

FIGS. 7 to 14 are graphs showing system throughput in a case where a confirm message is not transmitted in response to feedback data received from a UE. A typical urban (TU) model and a pedestrian-A (PA) model have been used as experimental models. In addition, 4 Tx antennas and 2 Rx antennas (4Tx-2Rx) are used, and a moving speed of the UE is 3 km/h or 15 km/h. A rank is set to 1 in FIGS. 7 to 10 and is set to 2 in FIGS. 11 to 14.

FIGS. 7 to 14 show a case where a BS uses a PMI included in the feedback data without alteration irrespective of presence/absence of errors, and the UE uses the reported PMI without alteration. The graphs of FIGS. 7 to 14 show system throughput with respect to an SNR when there is no error in the feedback data (indicated by 'perfect' in the figure), when an error rate is 1%, and when an error rate is 10% in comparison with two cases where a CQI transmission period is 3 TTI and a PMI transmission period is 6 TTI and where a CQI transmission period is 6 TTI and a PMI transmission period is 12 TTI. It is assumed herein that a CQI and an RI have no error.

It can be seen that system throughput decreases when the BS does not transmit the confirm message. The system throughput decreases by 4-5% when a 1% error occurs in the feedback data. The system throughput decreases by about 40% when a 10% error occurs in the feedback data.

FIGS. 15 to 22 are graphs showing system throughput in a case where a PMI transmitted one period earlier by a UE is used when an error occurs in feedback data received from the UE. A typical urban (TU) model and a pedestrian-A (PA) model have been used as experimental models. In addition, 4 Tx antennas and 2 Rx antennas (4Tx-2Rx) are used, and a moving speed of the UE is 3 km/h or 15 km/h. A rank is set to 1 in FIGS. 7 to 10 and set to 2 in FIGS. 11 to 14.

FIGS. 15 to 22 show a case where a BS uses a PMI included in the feedback data received one period earlier and reports the PMI to the UE. The graphs of FIGS. 7 to 14 show system throughput with respect to an SNR when there is no error in the feedback data (indicated by 'perfect' in the figure), when an error rate is 1%, and when an error rate is 10% in comparison with two cases where a CQI transmission period is 3 TTI and a PMI transmission period is 6 TTI and where a CQI transmission period is 6 TTI and a PMI transmission period is 12 TTI. It is assumed herein that a CQI and an RI have no error.

It can be seen that system throughput does almost not decrease even when the PMI transmitted one period earlier is used. By simply transmitting the confirm message in response to the feedback data received from the UE, the system throughput can be almost not affected by the error of the feedback data.

Every function as described above can be performed by a processor such as a microprocessor based on software coded to perform such function, a program code, etc., a controller, a micro-controller, an Application Specific Integrated Circuit (ASIC), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method of transmitting channel information in a multiple antenna system, the method comprising:
    transmitting a higher layer signal indicating whether a scheme in use is an open loop scheme or a closed loop scheme;
    receiving channel information comprising rank information; and
    transmitting a confirm message through a physical downlink control channel (PDCCH) as a response for the channel information,
    wherein the confirm message has a fixed bit size irrespective of which scheme is used and a value of the confirm message indicates different information according to the higher layer signal,
    wherein when the higher layer signal indicates an open loop scheme, the value of the confirm message indicates overriding rank information which overrides the received rank information, and
    when the higher layer signal indicates a closed loop scheme, the value of the confirm message indicates information informing whether the received channel information is used without alteration or information informing assignment of a dedicated control channel comprised in a physical downlink shared channel (PDSCH), wherein the dedicated control channel is used for transmitting of an override message to specify a rank information.

2. The method of claim 1, wherein the channel information further comprises precoding matrix index (PMI) information, and the confirm message comprises information indicating that the received PMI information is used without alteration in the closed loop scheme.

3. The method of claim 1, wherein the channel information further comprises precoding matrix index (PMI) information, and the confirm message comprises information indicating that, instead of using the received PMI information, PMI information received in a previous period is used in the closed loop scheme.

4. The method of claim 1, wherein the channel information further comprises precoding matrix index (PMI) information, and the confirm message comprises information indicating that a default PMI is used in the closed loop scheme.

5. The method of claim 1, further comprising:
transmitting an override message through the dedicated control channel to specify a rank information when the value of the confirm message indicates the information informing assignment of the dedicated control channel.

6. An apparatus to transmit channel information in a multiple antenna system, the apparatus comprising:
a plurality of transmission antennas; and
a processor coupled to the plurality of transmission antennas and configured for:
transmitting a higher layer signal indicating whether a scheme in use is an open loop scheme or a closed loop scheme;
receiving the channel information comprising rank information; and
transmitting a confirm message through a physical downlink control channel (PDCCH) as a response for the channel information,
wherein the confirm message has a fixed bit size irrespective of which scheme is used and a value of the confirm message indicates different information according to the higher layer signal,
wherein when the higher layer signal indicates an open loop scheme, the value of the confirm message indicates overriding rank information which overrides the received rank information, and
when the higher layer signal indicates a closed loop scheme, the value of the confirm message indicates information informing whether the received channel information is used without alteration or information informing assignment of a dedicated control channel comprised in a physical downlink shared channel (PDSCH), wherein the dedicated control channel is used for transmitting of an override message to specify a rank information.

* * * * *